Feb. 16, 1960 — R. J. KERR ET AL — 2,925,103
VALVE ASSEMBLY
Filed Nov. 23, 1956 — 2 Sheets-Sheet 1
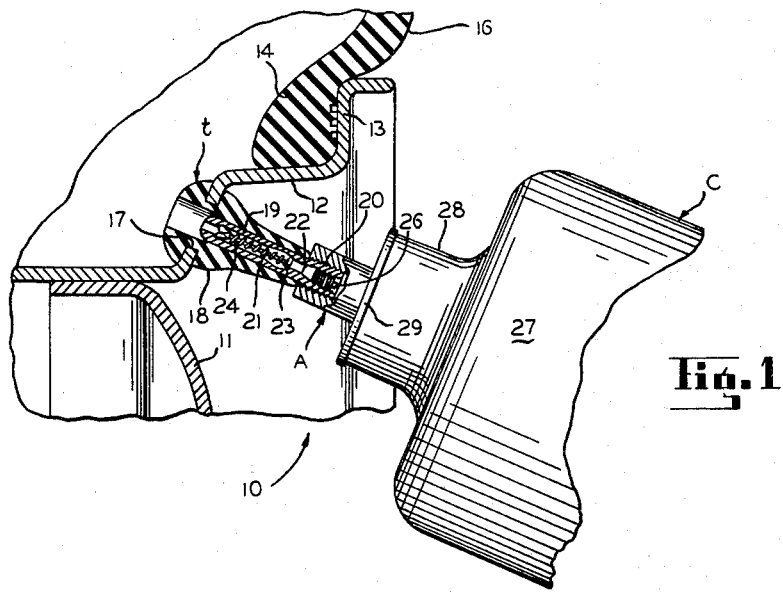
Fig. 1
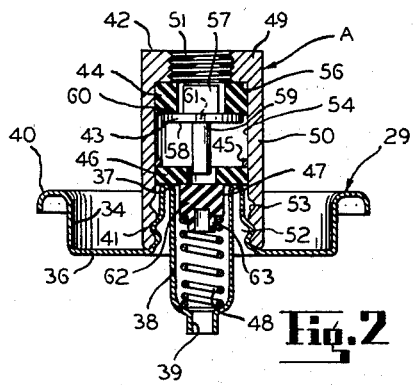
Fig. 2
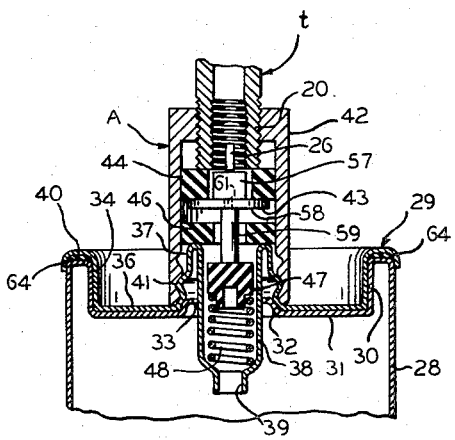
Fig. 3
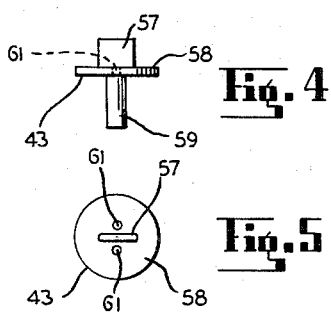
Fig. 4
Fig. 5
INVENTORS
ROBERT J. KERR
EDWARD H. GREEN
BY
ATTORNEYS

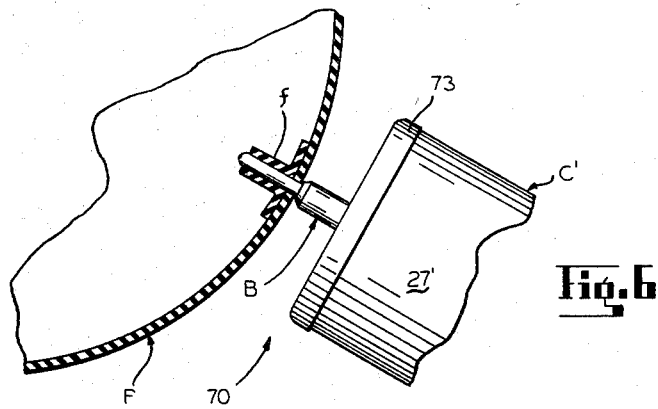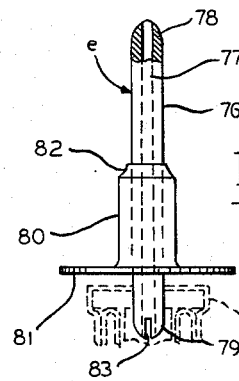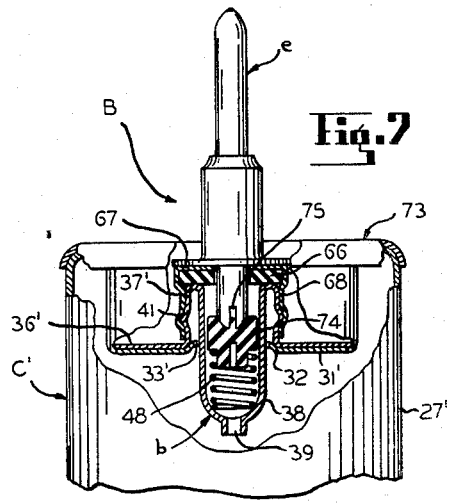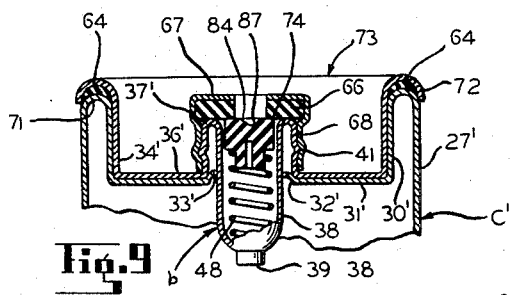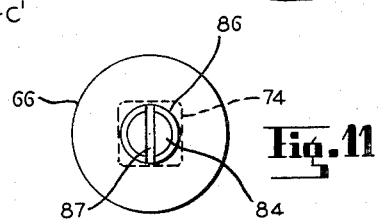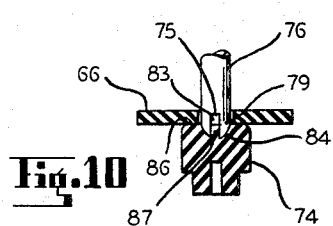

United States Patent Office 2,925,103
Patented Feb. 16, 1960

2,925,103
VALVE ASSEMBLY

Robert J. Kerr, Oak Park, and Edward H. Green, Addison, Ill., assignors to Kerr Chemicals, Inc., a corporation of Illinois Application November 23, 1956, Serial No. 624,113

5 Claims. (Cl. 141—349)

This invention relates to an improved valve assembly for use in conjunction with a pneumatic inflating mechanism. The invention more particularly relates to the combination of a valve assembly with a container of pressurized nonflammable fluid, so constructed and arranged that the valve assembly operates to release the fluid as a gas when the valve assembly is engaged with a pneumatically inflatable device.

Many of the prior art pneumatic inflating devices incorporate a separate control to admit the pressurized gas from the container to the receptacle after a connection has been established between the container and the receptacle. This feature not only necessitated an additional operation by the user, but also resulted in a more complex valve structure, with an attendant increase in the possibilities of malfunctioning of the device.

In addition, most of the prior art pneumatic inflating devices utilized a liquefied gas having a relatively low liquefaction temperature, such that when the gas was expanded through the valve into a receptacle, an extreme reduction in temperature at the valve occurred, causing the accumulation of frost on the valve and the resultant danger of freezing to the users' hands, if not otherwise making the operation of the device somewhat objectionable.

The present invention corrects many of these defects by providing an emergency tire inflating device that is self-actuating, in that the valve assembly on the pressurized liquefied gas container may be actuated to admit a flow of pressurized gas into a receptacle by effecting an inserted or threaded engagement between the discharge end portion of the valve assembly and the inlet of the receptacle to be inflated to a predetermined amount sufficient to unseat a plug valve in the valve assembly.

In addition, the emergency tire inflating device of the present invention contemplates the use of liquefied Freon 12 as the inflating gaseous element, the properties of which are well known and are such as to minimize frosting around the outer surface of the valve assembly during filling, with the attendant reduction in the danger to the users' hands.

Briefly described, the present invention contemplates a self-energizing valve assembly that is adapted to be used in conjunction with a container of pressurized noninflammable liquefied gas, such as Freon 12, to inflate pneumatic devices using a conventional "Schrader" type valve, and with devices utilizing the collapsible wall or flapper type valve. The container may be of any suitable type, but is preferably of the conventional "aerosol" type due to the general availability and utility of this type of container.

One of the valve assemblies of the invention is particularly adaptable for use with a conventional Schrader type valve having a threaded stem and depressible plunger, such as is used on automobile tire assemblies, and the like. In this embodiment of the invention, the valve assembly is permanently attached to the container of pressurized gas, and is so constructed as to be threadingly engageable with the stem of the tire valve. To effect a flow of gas into the tire, the valve assembly is provided with an actuating pin element that engages the plunger in the tire valve, such that when the valve assembly and container of the invention are threadingly engaged with each other to a predetermined amount or extent, the plunger of the tire valve, acting through the actuating pin of the valve assembly, will unseat a plug valve, thereby establishing a gas passage from the container through the valve assembly to inflate the tire. Each of the valve assemblies is constructed so as to permit the plug valve in the valve assembly of the invention to return to a closed position when the contents of the container have been exhausted, or the tire has been inflated to a desired degree, by simply disengaging the valve assembly and container from the device being inflated.

The modified embodiment of the valve assembly of the present invention is particularly adapted for use in inflating pneumatic devices of the type incorporating a conventional restricted conduit type valve, as for example a collapsible tube or flapper valve, such as is used in basketballs, footballs, air mattresses, and inflatable rafts, or the like. To this end, the modified version of the valve assembly of the present invention includes an elongated tubular member having an annular radial flange adjacent one end thereof, such that one of the end portions of the tubular member is insertable in the valve assembly of the device to be inflated, and the other end portion is insertable in the valve assembly that is connected to the container of liquefied gas, such that when the tubular member has been inserted into the pneumatic device to a predetermined extent, the plug valve element in the valve assembly will be unseated to provide a gas passage into the interior of the device, similar to the action provided by the plunger of the tire valve. Removal of the tubular member from the valve assemblies of the pneumatic device being inflated and of the liquefied gas container will permit the plug valve to reseat, thereby preventing the escape of liquefied gas from the container until used again. When the modified embodiment of the valve assembly is inoperative, the tubular member may be removed therefrom and conveniently stored until the device is to be used.

In addition, by incorporating liquefied Freon 12, or a gas of similar boiling point as the pressurizing fluid, extreme temperature reduction and frosting around the area of the valve assembly are minimized, thus reducing the danger of injury to the users' hands or body.

It is an object then of the present invention to provide an improved pneumatic inflating device, adapted for use with a conventional automobile tire and valve assembly and with devices utilizing a collapsible wall or flapper type valve.

Another object of the present invention is to provide an improved self-actuating valve assembly for the pressurized liquefied gas container of a pneumatic inflating device.

A further object of the present invention is to provide a simplified, self-actuating valve assembly for the pressurized liquefied gas container of a pneumatic inflating device that may be selectively activated by a threaded or inserted engagement between the end of the valve assembly of our invention and the valve of a device to be inflated.

Another object of the invention is to provide an improved pneumatic tire inflating device that is adapted for use in conjunction with a conventional automobile tire and valve assembly.

A further object of the present invention is to provide an improved pneumatic inflating device for use with pneumatic devices that utilize a conventional restricted conduit collapsible wall or flapper type valve assembly.

Another object of the invention is to provide a simplified valve assembly for use in an emergency pneumatic inflating mechanism, that has a fewer number of working parts and is easier to operate than the prior art devices.

Still another object of the invention is to provide an emergency pneumatic inflating mechanism utilizing a non-inflammable liquefied gas, such as Freon 12, that will minimize frosting around the valve assembly of the container and reduce the danger of freezing the users' hands.

Still another object of the invention is to provide an improved valve assembly for an emergency, single-or-multiple-use type of pneumatic inflating mechanism that requires no maintenance, is economical to produce, and is readily disposable after use.

Many other other objects and advantages of the present invention will become manifest to those versed in the art upon making reference to the detailed description which follows and the accompanying sheets of drawings which form a part of this specification.

On the drawings:

Figure 1 is a side elevational view of the pneumatic tire inflating mechanism of the present invention, with some parts in section, showing the liquefied gas container and valve assembly in connected operating position with a conventional automobile tire valve;

Figure 2 is an enlarged cross-sectional view of the valve assembly illustrated in Figure 1, showing the relative position of the parts of the valve assembly in a valve-closed position;

Figure 3 is a view similar to Figure 2, showing the valve assembly of our invention in a valve-open position when engaged with the valve plunger of an automobile tire valve;

Figure 4 is a side elevational view of the actuating pin member and centering disc in the valve assembly of the present invention;

Figure 5 is a top plan elevational view of the actuating pin member and centering disc in the valve assembly of the present invention;

Figure 6 is a reduced side elevational view of the pneumatic inflating mechanism of the present invention, with some parts in section, showing the liquefied gas container and a modified valve assembly of our invention in connected operating position with a pneumatic device utilizing a conventional restricted conduit collapsible wall or flapper type valve;

Figure 7 is an enlarged side elevational assembly view, with some parts in section, showing the relative position of the valve assembly parts and tubular insert of the modified valve assembly of the invention in a valve-open position, when the elongated tubular insert is engaged with the liquefied gas container and the device to be inflated;

Figure 8 is an elevational view of the elongated tubular insert member forming a part of our invention, that is adapted to engage the modified valve assembly and showing in phantom the relative position of the valve assembly when initially engaged with the tubular insert member;

Figure 9 is an enlarged cross-sectional view of the modified valve assembly of Figure 6, showing the relative position of the parts of the valve assembly in a valve-closed position;

Figure 10 is an enlarged side cross-sectional view, partly in section and partly in elevation showing the slotted engagement of the plug valve and slotted end of the tubular insert member when in valve-open position of Figure 7.

Figure 11 is a top plan view of the valve plug and annular seal of Figure 10.

As shown on the drawings:

In Figure 1, the valve assembly A of the present invention is illustrated in conjunction with an emergency tire inflating mechanism 10, that includes the valve assembly A, and a pressurized fluid container C. The tire inflating assembly 10 is shown connected to the tire valve assembly t of a wheel and tire assembly W.

The wheel and tire assembly W includes a hub 11 that is carried by a multi-flanged drop-centered type rim 12. The rim 12 is formed with a radially outwardly flanged portion 13, against which the beaded portion 14 of a typical tire casing 16 is retained. The rim 12 may be secured to the hub 11 in any conventional manner, such as by rivets or welding, and includes an aperture 17 that communicates with the interior of the casing 16 to receive the tubeless tire valve assembly t, and thus permit inflation of the tire.

As illustrated in Figure 1, the tire valve assembly t is of the conventional type, such as a Schrader valve, and may be formed, for example, with a generally tubular tapering resilient outer housing 18, that is bonded to a smaller concentric tubular valve body 19. The valve body 19 extends beyond the outer housing 18 to form a valve stem 20, that is internally and externally threaded according to conventional practices to receive a depressible plunger type valve element 21, and a valve cap (not shown). The valve element 21 includes a tapering seat portion 22, a conical plug valve and seat portion 23, that is normally biased into a closed position by a spring 24, and a depending plunger shaft 26 that serves to unseat the plug valve when it is desired to form a gas flow passage through the valve assembly t.

It should be understood that while the valve assembly t is of the type currently being used in tubeless tire and wheel assemblies, any other conventional valve assembly having a threaded depending stem portion 20 and depressible plunger shaft 26, similar to the valve assembly t, on the illustrated wheel and tire assembly W, could be used instead.

The container C is a can, which may be of metal or any other suitable material, and is formed with a generally cylindrical body portion 27 and a neck portion 28, which forms an outlet for the contents of the can and receives a generally cup-shaped cover 29.

As best shown in Figure 3, the neck portion 28 of the can C is formed with an integral reentrant annular wall 30 that includes an integral internally radially flanged end wall 31, on which is formed an axially outwardly extending pilot portion 32, that is centrally axially apertured at 33.

As best shown in Figures 2 and 3, the container cover 29 is formed with a reentrant annular side wall 34, an internal radially flanged endwall 36 and an outwardly axially extending pilot portion 37, the pilot portion 37 having an axially inwardly extending cup 38 formed therewith, that extends through the aperture 33 in end wall 31 and that is axially apertured as at 39 at its inner end portion to provide a flow passage for pressurized liquefied gas in the container C. The annular side wall 34 and end wall 36 of the container cover 29 are complementally formed to the annular side wall 30 and end wall 31 of the container neck 28 to facilitate a connecting engagement between these two members, and to insure a pressure tight seal when the container C has been charged with pressurized fluid. To this end, the annular side wall 34 of the container cover 29 includes an annular lip 40 that overlies the annular radial end edges of the neck 28 and permits a press fitted mechanical pressure seal connection between the cover 29 and the neck portion 28.

It should also be noted that the outwardly axially extending pilot portion 37 of the cover 29, includes an annular radially outwardly extending crimped portion 41 whose purpose and function will be described in more detail as the description proceeds.

The valve assembly A illustrated in Figures 2 and 3, generally includes a cylindrical thimble shaped sleeve 42, an actuating pin member 43, a pair of annular seals 44 and 46, a plug valve 47 and a spring 48. The thimble shaped sleeve portion 42 of the valve assembly A is formed with a generally thickened end wall 49 and a tubular side wall 50, the end wall 49 being axially threaded as at 51 to permit a threaded engagement with the threaded end portion of the valve stem 20 (Figure 1). The tubular side wall 50 includes an annular radial internal flange 45 that marginally retains the annular seal 46 in abutting pressure sealed engagement with the axially depending pilot portion 37, and is annularly grooved, as at 52 and 53, around its inner wall adjacent the axially depending pilot portion 37 of the cover 29, to receive the annular crimped portion 41 on the pilot portion 37 of the cover 29 when these members are press-fitted together, thus assuring a locked engagement between the valve assembly A and cover 29 as assembled.

It should be understood that while the pilot portion 37 of the cover 29 is shown formed with a single annular crimp 41 to engage the groove 52, an additional crimp could be provided to engage the groove 53 such as might be required to retain the sleeve 42 on the cover 29 where a different gas is used or where generally higher gas pressures are contemplated in the container C.

The tubular side wall 50 of the thimble shaped sleeve 42 is counterbored to form an inner wall 54 of a greater diameter than the centrally threaded bore 51 in the end wall 49, thus forming an annular retaining shoulder 56 for the annular seal 44. The outer diameter of seal 44 is such as will permit the seal to "float," or slide along the inner cylindrical surface of the inner wall 54 of the thimble-shaped sleeve 42 when the threaded stem portion is in operating engagement with the valve assembly A.

As shown in Figures 2 and 3, the actuating pin member 43 is normally positioned between the annular seals 44 and 46, and generally includes an upper rectangular end plate portion 57, a central annular disk portion 58, and a lower depending shaft portion 59. The end plate portion 57 is positioned in the thimble-shaped sleeve 42 so as to be enclosed by the annular seal 44 when the valve assembly A is in operation.

The annular disc portion 58 of the actuating pin member 43 has a diameter such as will permit its passage past the annular radial flange 45 during assembly of the valve assembly A, and will form an annular sealing surface 60 with the annular seal 44 when these parts come into abutting engagement, due to the axial advance of the stem portion 20 of tire valve assembly t in the valve assembly A.

As best shown in Figure 5, the radial disc portion 58 of the actuating pin member 43 is centrally apertured as at 61, adjacent the side face portions of the upper end plate 57 of the actuating pin member 43. The apertures 61 thus form metering orifices to regulate the flow of gas from the container C through the valve assembly A. It should be understood that while only two apertures 61 have been illustrated in Figure 5, more or fewer than this number could be used, depending upon the particular gas used, its confined pressure, and the time lapse desired for a given filling operation.

The lower shaft portion 59 of the actuating pin member 43 is sized to pass through the annular seal 46 and has an axial length such as to engage and unseat the plug valve 47, after the end plate portion 57 of the actuating pin member 43 has engaged the plunger shaft 26 of the tire valve element 21.

The plug valve 47 is positioned below the annular seal 46, and is preferably formed of nylon or any other suitable material having good wear and corrosion resistant properties. As shown in Figures 2 and 3, plug valve 47 includes an upper body portion 62 that may be circular or rectangular, and of a sufficient radial dimension as to close the apertured portion of the annular seal 46, and also includes a lower turned down pilot portion 63 which engages the end coils of the spring 48 to maintain axial alignment of the plug valve 47 in the cup 38, and to initially bias the plug valve 47 into sealed abutting engagement across the apertured portion of the lower annular seal 46.

Thus it will be appreciated that through the interaction of actuating pin member 43, annular seals 44 and 46, plug valve 47 and spring 48, valve assembly A will selectively admit a metered flow of gas from the container C into the interior of the tubeless tire casing 16, when the tire inflating assembly 10 has been threaded onto the tire valve t a sufficient distance to permit the plunger shaft portion 26 of the tire valve to unseat the plug valve 47 through the linking action of actuating pin member 43.

Referring now to Figures 2 and 3, the operation of the valve assembly A is as follows. After the internal components of the valve assembly A have been inserted in the cover 29 and thimble-shaped sleeve 42, and these members have been press-fitted into the assembled relationship shown in Figure 2, the valve assembly A and cover 29 are then press-fitted onto the neck of the container 28 a sufficient amount to seat the crimp 41 in annular groove 52 to provide the general arrangement of components shown in Figure 3. A suitable annular seal 64 may be inserted between the lip 40 of the cover 29 and the end wall of the container neck 28, in order to insure a pressure tight seal between these components. An appropriate sealer may be inserted between the cover 29 and the neck portion 28 of container C, according to conventional assembly practices if desired.

After the container C has been charged with a supply of liquefied gas, the respective components of the valve assembly A will assume the valve-closed position illustrated in Figure 2, due to the combined pressure of the confined gas, and the biasing action of spring 48. The annular seals 44 and 46 will thus prevent the escape of the gas through the valve assembly A, and the annular seal 64 will prevent the escape of gas between the neck 28 of the container C and the cover 29, thereby extending the useful shelf-life of the tire inflating assembly 10.

When an operator desires to inflate a tire, he need only thread the valve assembly A of the tire inflating assembly 10 onto the threaded portion 20 of the tire valve assembly t. As the valve assembly A is threaded onto the threaded portion of the valve stem 20, the valve stem 20 will first engage the upper annular seal 44, and advance it and the actuating pin member 43 axially downwardly in the sleeve 42, until the lower depending shaft portion 59 of actuating pin member 43 engages the plug valve 47. Due to the combined action of the spring 48 and pressure in the container C, continued threaded engagement of the valve assembly A onto the stem 20 of the tire valve t, will compress the annular seal 44 forming a pressure tight seal along the sealing surface 60, and at the same time permit engagement between the end plate portion 57 of the actuating pin member 43 and the plunger shaft 26 of the valve element 21.

The combined action of spring 48 and gas pressure acting on plug valve 47 will thus prevent an immediate unseating of plug valve 47 so that the plunger shaft 26 of the tire valve assembly t will first unseat the plug valve 23 of the tire valve element 21. When the plunger shaft 26 has opened the valve element 21 and bottomed, continued threaded engagement of the valve assembly A onto the stem 20 will then unseat the plug valve 47, and provide a gas flow passage from the container C through the aperture 39 and cup 38, around the plug valve 47, through annular seal 46 and metering apertures 61 to the tire valve assembly t, and thence into the interior of the tire casing 16.

When the tire has been inflated a desired amount, the operator need only unscrew the tire inflating assembly 10 from the tire valve t, thereby allowing the plug valve 47 to seat against the annular seal 46 under the influence of spring 48 and gas pressure in container C, and thus close the gas flow passage through the valve assembly A.

Continued unthreading of the valve assembly A from the stem 20 of tire valve assembly t will permit the plunger shaft 26 to advance axially outwardly into its closed position, thereby closing the conical plug valve 23 of the valve element 21 in the tire valve assembly t, thus preventing the escape of pressurized gas from the interior of the tire casing 16 in accordance with the well known operation of a conventional tire valve.

Thus it will be appreciated that the tire inflating assembly 10 provides a novel container and valve assembly that may be readily connected to the threaded valve stem portion of a pneumatically inflatable device utilizing a conventional Schrader type valve element, such as an automobile tire assembly, so that the device may be inflated to any desired pressure, and wherein the gas container C of the assembly may be readily recharged or disposed of as desired.

Referring now more particularly to Figures 6–11, a modified embodiment of the present invention is illustrated, in the form of a pneumatic inflating assembly 70 that is particularly adapted for use in filling pneumatically inflatable devices using a restricted conduit collapsible wall or flapper type valve, and in which like reference numerals are used to designate identical parts.

As best shown in Figure 6, the pneumatic inflating assembly 70 is comprised generally of a container C', a valve assembly b, and tubular insert e, the valve assembly b and tubular insert e, being designated generally by the reference letter B. The valve and insert assembly B is illustrated in operating position with a conventional collapsible wall or flapper type valve assembly f, such as is commonly used in various types of inflatable athletic and sports equipment, and an exemplary form of these devices is represented generally by the reference letter F in Figure 6.

As best shown in Figures 6 and 9, the container C' is a can, similar to the container C of Figure 1, and may be constructed of metal or any other suitable material, and is formed with a generally cylindrical body portion 27', having a reentrant annular side wall 30', a radial endwall 31 and a centrally apertured pilot portion 32'. The reentrant side wall 30' and container body 27' thus forming an annular rounded end 71.

The container C' also includes a cover 73 having a complemental annular side wall 34', end wall 36', central axially extending pilot portion 37' and an annular crimp 41, similar to the cover 29 of the valve assembly A. An annular complementally contoured lip 72 is also provided on the cover 73 to engage the end portion 71 of the container body 27'. An annular seal 64 is provided between the container end 71 and cover lip 72 to form a pressure tight seal between these components when the container C' is charged.

The pilot portion 37' includes an annular seal 66, similar to the seal 46 of the valve assembly A, that overlies the axially extending pilot portion 37', and is marginally retained in abutting engagement therewith by the annularly inturned flange portion 67 of a cylindrical sleeve-like retainer 68 that is seated in an annular marginal recess in the annular seal 66. The cover member 73 also includes a cup 38 that is integral with the axially extending pilot portion 37, the domed end of which is apertured as at 39, similar to the cup 38 of the valve assembly A. A plug valve 74 and retaining spring 48 are positioned in the cup 38, in retained relationship by the annular seal 66, in a similar manner to the corresponding components in the valve assembly A.

Thus it will be appreciated that the cover 73 for the container C', is substantially identical in structure and function to the cover 29 of the container C, with the exception of the crimped cylindrical sleeve retainer 68, which is necessary to retain the annular seal 66 in abutting sealing contact with the axially extending pilot portion 37, due to the absence of the thimble-shaped sleeve 42 in the valve and insert assembly B.

The valve assembly b of the valve and insert assembly B is thus comprised generally of the axially extending pilot portion 37 and cup 38, and the annular seal 66, cylindrical sleeve retainer 68, the plug valve 74 and biasing spring 48.

Referring now to Figure 8 in conjunction with Figure 7, the tubular insert or extension e is comprised generally of an elongated tubular body portion 76 that may be formed of any suitable material, preferably metal, having a central axial bore 77 therethrough and generally rounded outer and inner end portions 78 and 79, respectively. A sleeve 80 is positioned on the tubular body portion 76 at a point more nearly adjacent the end 79 of the body 76. The sleeve 80 includes an annular radially outwardly flanged portion or disc 81, at the end of the sleeve 80 adjacent the rounded inner end 79 of the tubular body 76, and a radially inwardly tapering shoulder 82 facing toward the rounded outer end 78 of the tubular body 76.

The flanged sleeve 80 may be made of any suitable material having good wear and corrosion resistant properties, but is preferably constructed of molded nylon, such that it may be readily fastened to the tubular body 76 by any conventional assembly procedure; however, a press-fit connection is preferred.

As most clearly shown in Figures 8 and 10, the end 79 of the tubular body portion 76 includes a diametrically extending slot 83 that bisects the axial bore 77 in the tubular body 76 to thus form a radial inlet for gases into the axial bore 77, as will be explained in more detail later.

In addition, it should be noted, that the axial dimensions of the tubular body portion 76 and the sleeve 80 are such that when the sleeve 80 has been properly positioned on the tubular body 76, end 78 of the tubular insert e will be fully inserted into the restricted conduit collapsible wall or flapper type valve assembly f (Figure 6) before the shoulder 82 engages the external periphery of the valve assembly, and that the lower axial length of the tubular body 76 that extends beyond the annular radial flange 81 is of a sufficient length to permit the lower end 79 to engage the plug valve 74 of the valve assembly b before the flange 81 comes into abutting engagement with the annular seal 66 and recessed retaining flange 67, of the sleeve retainer 68.

In order to prevent misalignment or binding of the plug valve 74 in the cup 38 when the end 79 of the tubular insert b is engaged with the plug valve 74 of the valve assembly b, the plug valve 74 is formed with a cup-shaped depression 84 in its upper engaging face portion 86 (Figures 9 and 10), similar to the rounded end portion 79 of the tubular body 76, the cup-shaped portion 84 being bisected by a diametrical centering web 87 (Figure 11) having a width substantially equal to the width of a slot 83 in the end 79 of the tubular body 76. When the end 79 of tubular insert e is properly engaged in the cup-shaped depression 84, a portion of slot 83 will be radially exposed to form an inlet 75 for gas flowing around plug valve 74 into the axial bore of the tubular insert e then the inflating mechanism 70 is in operation.

Thus the diametric web 87 and the cup-shaped depression 84 in the plug valve 74 will insure and oriented engagement of the tubular insert e into the valve assemblies b and prevent the plug valve 74 from improperly seating against the annular seal 66 at the termination of an inflating operation, and will also prevent the plug valve 74 from becoming cocked or radially displaced in the cup 38 during the filling operation, which otherwise might hamper the flow of gas from the container C' into the device F.

The operation of the pneumatic inflating assembly 70 is as follows. After the container C' has been sufficiently charged with a pressurized gas, and the valve assembly b is in a closed position, as indicated in Figure 9, the assembly is ready for use.

To initiate inflation of a pneumatic device F, the operator need only insert the end 79 of the tubular insert e through the apertured annular seal 66 of the valve assembly b, so that the web 87 engages the slot 83. When the insert e and valve assembly b are thus engaged, they will assume the relative positions indicated in dotted lines in Figure 8, prior to actual flow of gas from the container C' into the device F.

When the tubular insert e and valve assembly b of the valve and tubular insert assembly B are thus in the oriented position illustrated in Figure 8, the operator need only insert the rounded end 78 of the tubular insert e into the valve assembly f of the device F to be inflated. Continued axial insertion of the insert e into the valve assembly f will bring the shoulder 82 into abutting contact with the outer surface of the valve assembly f and at the same time will establish registry between axial bore 77 and the interior of the pneumatic device F. At this point, further axial insertion of the tubular member e will be prevented, and the inner end 79 of the tubular body 76 will thus unseat the plug valve 74, thereby forming a flow passage for pressurized gas in the container C' through the valve assembly body b, and radial inlet 75 and then through the axial bore 77 of the tubular insert e to the interior of the device to be inflated F.

When the device F has been inflated to a desired amount, the operator may stop further inflation by merely withdrawing the valve and tubular insert assembly B out of engagement with the valve f of the device F. Plug valve 74 will immediately be seated against the annular seal 66 under the influence of pressurized gas in the container C' and the biasing action of spring 48, thus preventing any further flow of gas through the valve assembly b. Continued axial withdrawal of the tubular insert e from the valve body f, will thus permit the valve f to close, thereby preventing any escape of pressurized gas from the device F.

When disassociated from the tubular insert e, the container C' of the pneumatic inflating assembly 70 may easily be stored for future use, or if exhausted, may be discarded or recharged as desired.

Thus it will be appreciated that the pneumatic inflating assembly 70 provides an improved pneumatic inflating device for use in conjunction with various pneumatic devices that incorporate a conventional collapsible wall or flapper type valve assembly, that is simply constructed, has no moving parts in operation and is easily stored for emergency or general use.

While only two specific embodiments of the invention have been herein described, it should be understood that variations and modifications may be effected without departing from the scope of the novel concepts herein disclosed.

We claim as our invention:

1. In an inflating mechanism adapted for use with a pneumatic device having a restricted conduit type valve and the like, a container of liquefied gas having an outlet, the improvement comprising a valve assembly comprising a valve member and a tubular insertable member frictionally positionable within said valve member, said valve member including a valve body part having an aperture therein registering with the interior of said container, seal means between said valve member and tubular insertable member, and a plug valve normally closing the outlet in said container, said tubular insertable member including a sleeve having an annular radial disc formed thereon to determine the axial engagement position between said valve member, said tubular insertable member and said pneumatic device to be inflated.

2. In an inflating mechanism adapted for use with a pneumatic device utilizing a restricted conduit type valve and the like, including a container for a liquefied gas having an apertured axially depending pilot portion the improvement comprising a valve assembly for said container, said valve assembly comprising a valve member and a tubular insertable member frictionally positionable within said valve member, said valve member including a valve body part positioned in the axially depending pilot portion of said container, annular seal means around said apertured pilot portion defining an outlet for said valve member, and a plug valve normally closing the outlet in said valve member, said tubular insertable member having stop means formed thereon defining an inner end insertable in said valve member and an outer end insertable in the pneumatic device to be inflated, said inner and outer ends forming a flow passage from said container to the pneumatic device established by a predetermined axial engagement therebetween.

3. In a pneumatic inflating mechanism, adapted for use with a pneumatic device utilizing a restricted conduit type valve and the like, including therefor a container for a pressurized fluid, the improvement comprising a valve member on said container, and a tubular insertable member engageable with said pneumatic device and frictionally positionable within said valve member on said container, said valve member having an aperture formed therein defining an outlet for said container, a plug valve normally closing said outlet, and seal means to prevent the escape of pressurized fluid from said container, said tubular insertable member having a radially flanged sleeve thereon dividing said tubular insertable member into an outer body portion engageable with the pneumatic device to be inflated and an inner body portion engageable with the valve member on said container, said radially flanged sleeve forming a stop cooperable with the restricted conduit valve on the pneumatic device and the valve member on said container to unseat said plug valve and permit a flow of liquefied gas into said pneumatic device.

4. In a pneumatic inflating mechanism, adapted for use with a pneumatic device utilizing a restricted conduit type valve and the like, including therefor a container of pressurized fluid, the improvement comprising a valve member on said container, and a tubular insertable member engageable with said pneumatic device and frictionally positionable within said valve member on said container, said valve member having an aperture formed therein defining an outlet for said container, a plug valve normally closing said outlet and having an indexing recess formed therein, and seal means to prevent the escape of pressurized fluid from said container, said tubular insertable member having a radially flanged sleeve thereon dividing said tubular insertable member into an outer body portion engageable with the pneumatic device to be inflated and an inner body portion engageable with the valve member on said container, said inner body portion having a slotted end portion engageable with the indexing recess in said plug valve to maintain axial alignment therebetween, said radially flanged sleeve forming a stop to cooperably engage the restricted conduit valve on the pneumatic device and the valve member on said container to unseat said plug valve and permit a flow of liquefied gas into said pneumatic device.

5. In a pneumatic inflating mechanism adapted to be used for inflating a pneumatic device utilizing a restricted conduit type valve which mechanism includes a container for storing pressurized fluid, the improvement comprising a valve member having an aperture formed therein defining an outlet for said container, an elongated guide forming a part of said valve member and terminating at said aperture, a resilient seal mounted on said valve member having an aperture formed therein in registry with said first mentioned aperture, a resilient valve slidably and loosely disposed within said guide and guided for reciprocable movement thereby and engageable with said resilient seal to prevent fluid flow from said container through said first mentioned outlet, a radially inwardly extending shoulder formed at the inner end of said guide, biasing means seated on said shoulder and engageable with said valve to urge said valve into sealing engagement with said seal, a tubular insertable member adapted to be inserted in the restricted conduit valve of a pneumatic device having a radial flange formed thereon engageable with said valve member and having a portion insertable through said first and second mentioned apertures and frictionally maintained therein and engageable with said valve to move said valve out of sealing engagement with said seal, said resilient valve having a depressed face formed therein adapted to receive the inner end of said insertable member.

References Cited in the file of this patent

UNITED STATES PATENTS

| | | |
|---|---|---|
| 1,066,066 | Vidy | July 1, 1913 |
| 1,197,126 | Hutton | Sept. 5, 1916 |
| 1,370,128 | Kraft | Mar. 1, 1921 |
| 1,390,283 | Edelmann | Sept. 13, 1921 |
| 1,825,941 | Davis | Oct. 6, 1931 |
| 2,498,596 | Wallach | Feb. 21, 1950 |
| 2,557,807 | Wagner | June 19, 1951 |
| 2,565,954 | Dey | Aug. 28, 1951 |
| 2,689,768 | Falligant | Sept. 21, 1954 |
| 2,728,509 | Peterson | Dec. 27, 1955 |
| 2,730,380 | Espy et al. | Jan. 10, 1956 |
| 2,731,278 | Soderstrom | Jan. 17, 1956 |
| 2,793,504 | Webster | May 28, 1957 |

FOREIGN PATENTS

| | | |
|---|---|---|
| 238,634 | Great Britain | Aug. 27, 1925 |
| 239,535 | Switzerland | Feb. 1, 1946 |